(12) United States Patent
Klein et al.

(10) Patent No.: US 8,989,168 B2
(45) Date of Patent: *Mar. 24, 2015

(54) METHOD FOR ADAPTING DATA RATES

(75) Inventors: Anja Klein, Berlin (DE); Reinhard Koehn, Berlin (DE); Joern Krause, Berlin (DE); Volker Sommer, Berlin (DE); Thomas Ulrich, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 961 days.

This patent is subject to a terminal disclaimer.

(21) Appl. No.: 12/140,158

(22) Filed: Jun. 16, 2008

(65) Prior Publication Data
US 2009/0003302 A1  Jan. 1, 2009

Related U.S. Application Data

(63) Continuation of application No. 10/747,024, filed on Dec. 23, 2003, now Pat. No. 7,403,781, which is a continuation of application No. 09/806,628, filed as application No. PCT/DE99/03182 on Oct. 1, 1999, now abandoned.

(30) Foreign Application Priority Data

Oct. 6, 1998 (DE) .................................. 198 46 067
May 19, 1999 (DE) .................................. 199 22 968

(51) Int. Cl.
*H04B 7/216* (2006.01)
*H04L 1/00* (2006.01)
(Continued)

(52) U.S. Cl.
CPC ............ *H04L 1/0067* (2013.01); *H04B 7/2646* (2013.01); *H04L 1/0002* (2013.01); *H04L 1/0017* (2013.01); *H04W 28/22* (2013.01); *H04B 2201/70703* (2013.01); *H04W 84/04* (2013.01)
USPC .......................................... 370/342; 370/335

(58) Field of Classification Search
CPC .............................. H04W 28/18; H04W 28/22
USPC ................................................... 370/342, 335
See application file for complete search history.

(56) References Cited

U.S. PATENT DOCUMENTS 4,930,140 A  5/1990 Cripps et al.
5,309,474 A  5/1994 Gilhousen et al.
(Continued)

FOREIGN PATENT DOCUMENTS

EP  0 809 373 A2  11/1997
WO  98/42153  9/1998

OTHER PUBLICATIONS

M. Naghshineh et al.; "End-to-End QoS Provisioning in Multimedia Wireless/Mobile Networks Using an Adaptive Framework", IEEE Communications Magazine, vol. 35, NR. 11. Nov. 1997, pp. 72-81.
(Continued)

*Primary Examiner* — Shripal Khajuria
*Assistant Examiner* — Farhad Ali
(74) *Attorney, Agent, or Firm* — Staas & Halsey LLP

(57) ABSTRACT

Data rates of simultaneous radio transmissions of data are matched for services over a connection between a base station and a subscriber station by determining a service-specific rate matching factor for one of the services based on a steady-state rate matching factor and a dynamic rate matching factor. The dynamic connection-oriented rate matching factor is based on the steady-state matching factor. The dynamic-connection oriented rate matching factor matches a sum of a volume of data for the services over the connection to a volume of data available in a next frame of data. In addition, the data is compressed or expanded for the one of the services based on the corresponding service-specific rate matching factor.

9 Claims, 4 Drawing Sheets

(51) Int. Cl.
*H04B 7/26* (2006.01)
*H04W 28/22* (2009.01)
*H04W 84/04* (2009.01)

(56) References Cited

U.S. PATENT DOCUMENTS

| | | | |
|---|---|---|---|
| 5,490,136 | A | 2/1996 | Sereno et al. |
| 5,581,575 | A | 12/1996 | Zehavi et al. |
| 5,822,318 | A | 10/1998 | Tiedemann, Jr. et al. |
| 5,857,147 | A | 1/1999 | Gardner et al. |
| 5,909,434 | A * | 6/1999 | Odenwalder et al. ......... 370/342 |
| 5,918,002 | A | 6/1999 | Klemets et al. |
| 5,982,813 | A | 11/1999 | Dutta et al. |
| 6,307,867 | B1 * | 10/2001 | Roobol et al. ................ 370/470 |
| 6,363,058 | B1 | 3/2002 | Roobol et al. |
| 6,501,748 | B1 * | 12/2002 | Belaiche ...................... 370/342 |
| 7,403,781 | B2 | 7/2008 | Klein et al. |
| 2005/0220047 | A1 | 10/2005 | Baey et al. |

OTHER PUBLICATIONS

Pål Frenger et al.; "Rate Matching in Multichannel Systems using RCPC-Codes"; 1997; pp. 354-357.

ETSI STC SMG2 UMTS-LI, UTRA Physical Layer Description FDD parts (v0.4, Jun. 25, 1998).

Toskala et al.; "Frames FMA2 Wideband-CDMA for UMTS", 1998, 9:325-335.

German Office Action for Application No. 199 22 968.6-55 dated Sep. 2007.

International Search Report for PCT/DE99/03182; mailed Mar. 31, 2000.

* cited by examiner

| | Maximum gross data rate | Minimum gross data rate | Dynamic range | Block size | Coding |
|---|---|---|---|---|---|
| Service S1 (d1) | 200 kbps | 40 kbps | Only two possible rates | 400 bit | Absolute with 1 bit |
| Service S2 (d2) | 1200 kbps | 0 kbps | High | 600 bit | Relative |
| Service S3 (d3) | 80 kbps | 80 kbps | Constant data rate | 800 bit | Not required |

Fig. 2

METHOD FOR ADAPTING DATA RATES

CROSS REFERENCE TO RELATED APPLICATIONS

This application is a continuation of application Ser. No. 10/747,024, filed Dec. 23, 2003, now U.S. Pat. No. 7,403,781, which is a continuation of 09/806,628, filed Jun. 20, 2001, abandoned, which is a National Stage entry of PCT/DE99/03182 filed Oct. 1, 1999, which claimed priority to German Application No. 198 46 067.8, filed on Oct. 6, 1998, and German Application No. 199 22 968.6 filed on May 19, 1999, the contents of which are hereby incorporated by reference.

BACKGROUND

The invention relates to a method for matching data rates for transmitting data via a radio interface between a base station and a subscriber station, especially via broadband radio interfaces which use a CDMA subscriber separation method and simultaneously provide a number of services per call.

In radio communication systems, messages (for example voice, image information or other data) are transmitted via a radio interface with the aid of electromagnetic waves. The radio interface relates to a connection between a base station and subscriber stations where the subscriber stations can be mobile stations or stationary radio stations. The electromagnetic waves are radiated at carrier frequencies in the frequency band intended for the respective system. For future radio communication systems, for example the UMTS (Universal Mobile Telecommunication System) or other third-generation systems, frequencies are provided in the frequency band of approx. 2 000 MHz.

For the third generation of mobile radios, broadband (B=5 MHz) radio interfaces are provided which use a CDMA (Code Division Multiple Access) subscriber separation method for distinguishing between different transmission channels and can simultaneously provide a number of services per call. The problem is how the data of different services of a call are to be time-division multiplexed, i.e. inserted into a frame. The transmission capacity of the radio interface must be utilized in the best possible way, especially taking into consideration a highly dynamic variance in the data rates of the individual services.

From ETSI STC SMG2 UMTS-L1, Tdoc SMG2 UMTS-L1 221/98 of Aug. 25, 1998, especially pages 15-20, it is known to perform a two-stage data rate matching. First data rate matching is performed after channel coding and is intended to guarantee the service-specific qualities of service since the joint transmission of the data of a number of services makes a common signal/noise ratio mandatory. A second data rate matching after the multiplexing guarantees continuous transmission. The disadvantage of this solution can be seen in the fact that it is not possible to minimize the number of required transmission channels or at least, by spreading, the required transmitting power in the transmission channels. The code efficiency also drops since, in part, an expansion followed by a compression or conversely is performed on the same data. The code efficiency specifies the ratio between the change in the bit error rate (BER) and change in the redundancy of the data, the signal/noise ratio being considered as constant.

SUMMARY

It is the object of the invention to eliminate these disadvantages. This object is achieved by the method having the features of claim 1. Advantageous further developments of the invention can be found in the subclaims.

According to the invention, a service-specific steady-state rate matching factor which sets a service-specific quality of service is determined as already known. However, the rate matching is not performed using this factor. Instead, a dynamic call-oriented rate matching factor is determined for the call which matches the hypothetical volume of data to a volume of data available in the next frame, taking into consideration the service-specific data rate matching yet to be performed. It is also possible in this case to pass through a number of optimization loops if this volume of data is not permanently predetermined due to there being an adequate number of transmission channels and spread factors.

It is thus possible to optimize the total transmission capacity needed.

In a next step, a service-specific rate matching factor is determined by combining the steady-state rate matching factor and the dynamic call-oriented rate matching factor and only then performing the single and thus single-stage data rate matching. Thus, the data of the services are compressed or expanded by means of these service-specific rate matching factors and are inserted into a frame for transmission.

The steady-state and dynamic rate matching is performed at the same time in one step in which it is only possible to perform the calculation of the factors but not the matching itself in an optimization loop so that the code efficiency increases and conflicting rate matching for the same data is prevented.

If certain frame intervals must be shortened in order to perform measurements (slotted mode), this can already be taken into consideration in the available volume of data.

According to an advantageous further development of the invention, the dynamic call-oriented rate matching factor is set to a minimum value related to the service to be compressed most severely and for this purpose, a number of transmission channels and of spread factors to be used during the transmission is determined in accordance with a predetermined coding rule. Once this has been done, the dynamic call-oriented rate matching factor is then determined as a quotient of the maximum volume of data available for the call and the sum of the volume of data of all services of the call, taking into consideration the respective service-specific steady-state rate matching factors. The minimum value is established so that the code efficiency is not impaired too much. This further development of the invention needs minimum resources.

If the dynamic call-oriented rate matching factor is greater than a maximum value related to the service to be expanded most severely, it is advantageous to accept additional data into the frame and to redetermine the dynamic call-oriented rate matching factor. Thus, transmission capacity is not unnecessarily given away.

Before the dynamic call-oriented rate matching factor is determined, the steady-state rate matching factors are advantageously referred to their geometric mean in such a manner that the product of all steady-state rate matching factors of a call is equal to one. Thus, only the lowest possible rate matching is necessary for optimizing the code efficiency when the data rates of the services are similar.

A mapping rule for multiplexing the data of the services into a frame to be transmitted is advantageously specified in such a manner that it is simultaneously known to the transmitting and receiving end so that only the volume of data per service is signaled and the arrangement of the data in the frame can be unambiguously duplicated. The rate matching can also be reconstructed from the signaled volume of data.

BRIEF DESCRIPTION OF THE DRAWINGS

Exemplary embodiments of the invention will be explained in greater detail with reference to the attached drawings, in which:

FIG. 2 shows a diagrammatic representation of requirements for three services to be transmitted simultaneously.

DETAILED DESCRIPTION OF THE PREFERRED EMBODIMENT

Figure 1:
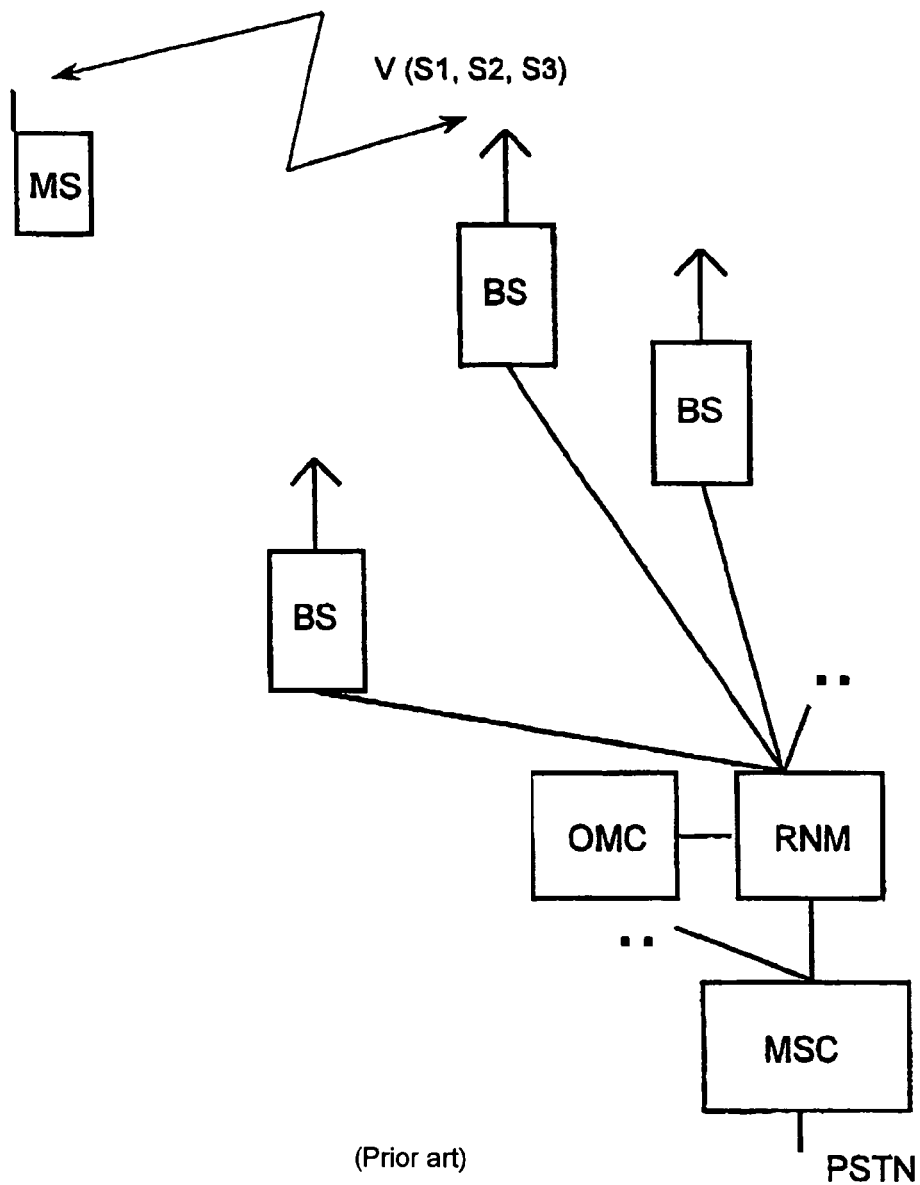
FIG. 1 shows a diagrammatic representation of a radio communication system.

The mobile radio system shown in FIG. 1 as an example of a radio communication system consists of a multiplicity of mobile switching centers MSC which are networked together and set up the access to a landline network PSTN. Furthermore, these mobile switching centers MSC are connected to in each case at least one facility RNM for allocating radio resources. Each of these facilities RNM, in turn, provides-for a connection to at least one base station BS. Such a base station BS can set up a call to subscriber stations, e.g. mobile stations MS or other mobile and stationary terminals via a radio interface. Each base station BS forms at least one radio cell.

FIG. 1 shows a connection V for the simultaneous transmission of user information of a number of services S1, S2, S3 between a base station BS and a mobile station MS. An operation and maintenance center OMC implements control and maintenance functions for the mobile radio system or for parts thereof. The functionality of this structure can be transferred to other radio communication systems in which the invention can be used, especially for subscriber access networks with wireless subscriber access.

In the connection V, the data d1, d2, d3 of three different services S1, S2, S3 are simultaneously transmitted in accordance with FIG. 2. These three services S1, S2, S3 greatly differ in the possible values and the dynamic range of the data rate. The block sizes B and absolute or relative coding were selected correspondingly.

Figure 3:
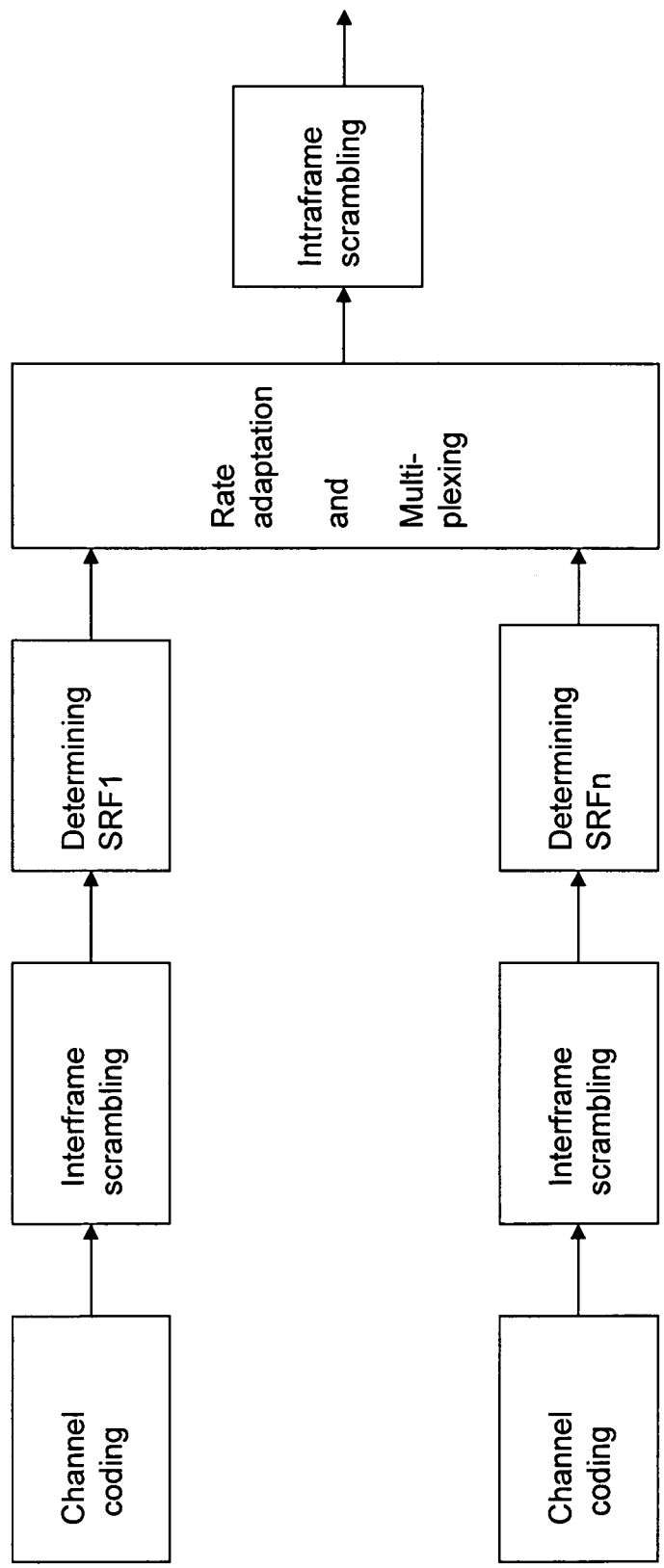
FIG. 3 shows a block diagram of a rate matching method.

With reference to FIG. 3, channel coding is carried out at the transmission end as the first step in data transmission for each service S1, S2, S3, and is selected for each service individually as a function of the required maximum bit error rate (BER). Then, as an option for each service S1, S2, S3, the data d1, d2, d3 are scrambled over a number of frames fr (interframe scrambling), and the steady-state rate matching factors SRFi are then determined for each of the services i. A service-specific quality of service is set in the process.

Rate matching is carried out as the next step, with the algorithm that is described in the following text at the same time including the multiplexing of the services. The rate matching and the multiplexing are followed by scrambling of the data within a frame fr (intraframe scrambling).

The service-specific rate matching factors SFRi for each service i describe expansion or compression of the data, with expansion being achieved by addition of redundancy (for example repetition of individual bits), and compression being achieved, for example, by puncturing. The coding, and hence the addition of redundancy, can also be set adaptively depending on the specific rate matching factors. These service-specific rate matching factors SFRi do not depend on the amount of data to be transmitted for each service S1, S2, S3 in the next frame fr, but on the channel coding method.

In order to optimize the code efficiency, the service-specific steady-state rate matching factors $SRF_i$ are related to their geometric mean value, so that:

$$\prod_{i=1}^{n} SRF_i = 1 \quad (1)$$

Figure 4:
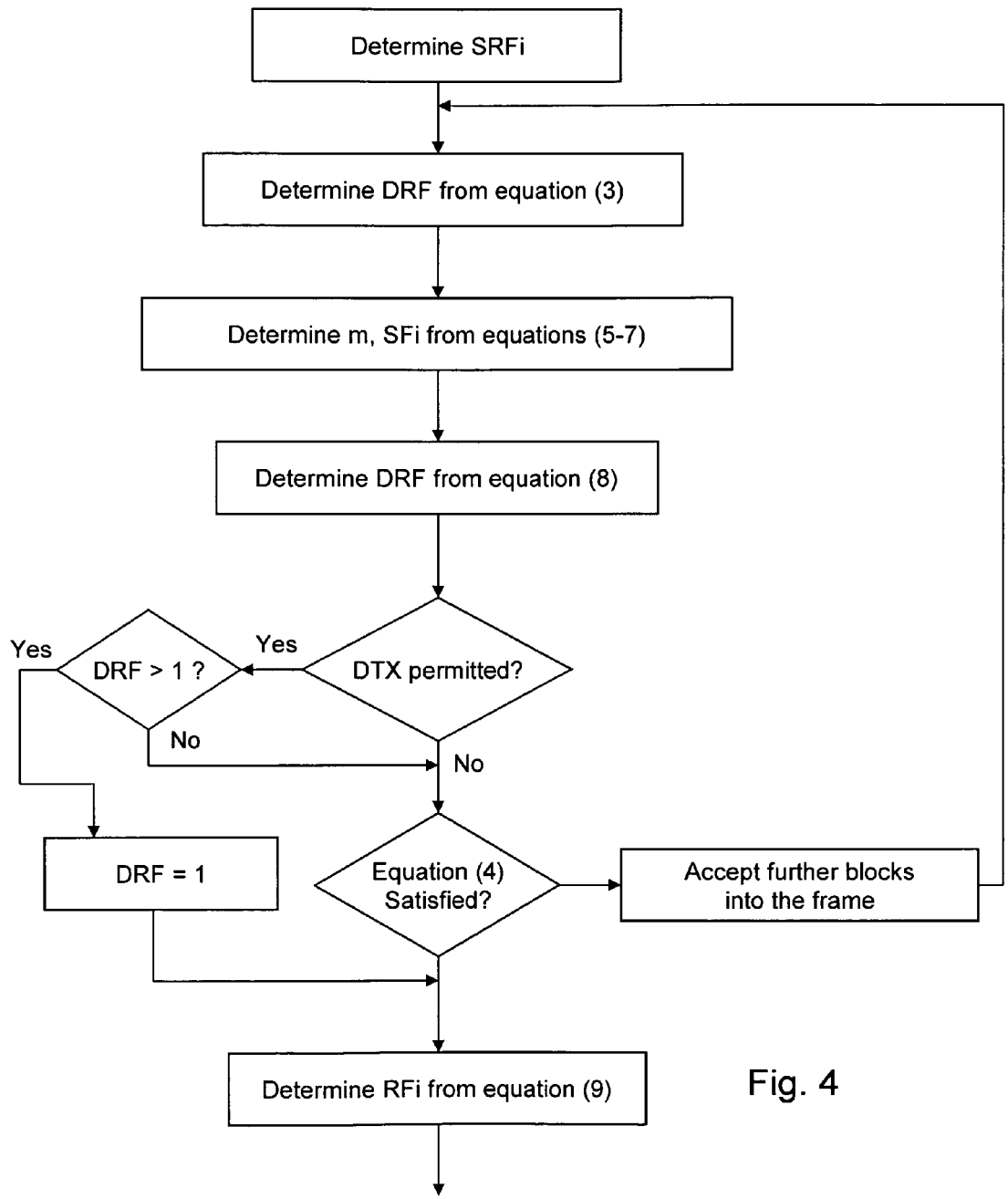
FIG. 4 shows a representation of an optimization loop in the rate matching.

The calculation of the factors SRF, DRF, RF, SF, m needed for rate matching and multiplexing is explained with reference to FIG. 4.

Using the minimum spread factor (SF=4), Nmax bits can be transmitted in a frame fr. Thus, the following inequality can be specified which describes the dependence between the transmission capacity in a frame, given by the number m and the respective spread factor SFj (j=1 ... m) of the transmission channels and that required by the data blocks of the n services:

$$DRF \cdot \sum_{i=1}^{n} Bi \cdot Ki \cdot SRFi \leq \sum_{j=1}^{m} N \text{ max} \cdot \frac{SF \text{ min}}{SFj} \quad (2)$$

The right-hand side of equation (2) describes the number of bits per frame fr available with m transmission channels whereas on the left-hand side of the inequality, the capacity required by n services, of which in each case Ki blocks with the block size Ki and the steady-state rate matching factors SRFi are to be transmitted, is given.

The dynamic rate matching factor DRF introduced in equation (2) provides for the additional uniform expansion and compression of all data in a frame f r. This factor DRF is call-oriented. The equals sign applies if the frame fr has to be filled completely with data in order to avoid a discontinuous transmission (DTX).

When the call-oriented dynamic rate matching factor DRF is determined, it must not drop below a minimum value which is the quotient of the minimum total rate matching factor RFmin and the minimum of all steady-state rate matching factors SRF so that the code efficiency is not impaired too much by puncturing.

$$DRF \geq DRF \text{ min} = \frac{RF \text{ min}}{\underset{i}{\text{Min}}(SRFi)} \quad (3a)$$

According to the preceding inequality (3a), the calculation of the minimum value DRFmin is valid for the special case where the same minimum total rate matching factor RFmin applies to all services i. In general, however, individual total rate matching factors RFmin can also apply to different services i. Thus, for a certain service i, for example, the case may occur that no puncturing is performed (RFmin=1) whereas puncturing is still performed for other services i. Depending on the coding method used, an individual minimum total rate matching factor RFmin can thus be allocated to each service i. To take this variability of the service-dependent total rate matching factor RFmin into account, the inequality (3a) is expanded in the following manner:

$$DRF \geq DRF\min = \max_i\left(\frac{RF\min, i}{SRFi}\right) \tag{3b}$$

Analogously, neither should a maximum value be exceeded which is the quotient of the maximum total rate matching factor RFmax and the maximum of all steady-state rate matching factors SRF so that not too much transmission capacity is given away by repetition.

$$DRF \leq DRF\max = \frac{RF\max}{\max_i(SRFi)} \tag{4}$$

Using equation (2), the values for m, SFj and DRF which allow optimum utilization of the physical channels can thus now be calculated in dependence on Bi, Ki and SRFi. For this purpose, it is only necessary to establish an unambiguous order of spread-spectrum codes between transmitter and receiver, which are allocated in dependence on the total number of bits to be transmitted in a frame fr. This mapping rule is established throughout the system or is signaled at the beginning of a call.

In the text which follows, a boundary condition is assumed which stipulates occupation of the least number of transmission channels possible. In this case, it holds true that when m>1, all transmission channels apart from one transmission channel must have the minimum spread factor SFmin. It should be emphasized that the coding rule according to equations (5) to (7) is one of a number of possible examples since other boundary conditions can also be assumed.

Using the minimum permissible value of the dynamic rate matching factor DRFmin from equation (3a, 3b), the following is obtained for the required number of channels m ($\lceil\ \rceil$=rounding-up operator):

$$m = \left\lceil \frac{1}{N\max} \cdot DRF\min \cdot \sum_{i=1}^{n} Bi \cdot Ki \cdot SRFi \right\rceil \tag{5}$$

and the spread factors $$SFm = \left\lfloor \frac{SF\min \cdot N\max}{DRF\min \cdot \sum Bi \cdot Ki \cdot SRFi - (m-1) \cdot N\max} \right\rfloor \tag{6}$$

where $\lfloor\ \rfloor$ is the rounding-down operator to the next possible spread factor $$SFj=4 \text{ for } m>1 \text{ and } j=1\ldots m-1. \tag{7}$$

The dynamic rate matching factor DRF is now recalculated in deviation from its minimum value DRFmin:

$$DRF = \frac{N\max \cdot \left(m - 1 + \frac{SF\min}{SFm}\right)}{\sum_{i=1}^{n} Bi \cdot Ki \cdot SRFi} \tag{8}$$

Instead of the product Bi*Ki, a volume of data Ni can also be used if there is no block-by-block transmission or the block size Bi is equal to one bit.

To impair the code efficiency as little as possible, the expansion or compression should be restricted to the minimum required, with the consequence that the dynamic rate matching factor DRF should be as close as possible to 1. This means that in the case of discontinuous transmission, the possible transmission capacity must be completely utilized if, as a result, the compression can be reduced. Even with discontinuous transmission, a value is taken from equation (8) as long as it is less than or equal to 1. If DRF>1, DRF is set to 1.

Knowing the dynamic rate matching factor DRF means that the resultant rate matching factor RFi can be specified for all services i:

$$RFi=DRF*SRFi(i=1\ldots n) \tag{9}$$

If RFi>1 for a service i bits are repeated and if RF<1, puncturing is performed. In each case, only one of the two methods is used by the rate matching in one step for the data d1, d2, d3 for each service.

Combining steady-state and dynamic rate matching automatically minimizes the number m of transmission channels needed and, at the same time, maximizes the spread factors SF in order to generate as little interference as possible. Thus, the implicit dynamic rate matching also has an advantageous effect if DTX is permitted.

Optionally, if the dynamic rate matching factor is DRF>DRFmax, individual blocks of those intended for transmission and temporarily stored in a wait loop can be selected and added to the blocks already allocated to the frame fr. The factors SRF, DRF, RF are recalculated in the sense of an optimization loop. If the number m of transmission channels does not need to be increased and the spread factors SF do not need to be reduced, the block can be transmitted in addition to the other data.

The invention claimed is:

1. A method for data rate matching for simultaneous radio transmission of data of a plurality of services of a connection between a base station and a subscriber station, comprising:
    compressing/expanding the data of a service of the plurality of services of the connection to be transmitted in a frame using a service-specific overall rate matching factor which matches a total volume of data to be transmitted of two or more services of the connection to a transmission capacity in the frame, the total volume determined by a combination of a service-specific steady-state rate matching factor and a dynamic connection-oriented rate matching factor, the dynamic connection-oriented rate matching factor being a service-dependent total rate matching factor that matches a total volume of data of the two or more services of the connection taking into consideration the service-specific steady-state rate matching factors of the services.

2. A method according to claim 1, further comprising:
    setting the dynamic connection-oriented rate matching factor to a minimum value related to a most compressed service to be compressed most severely by:
        determining a number of transmission channels and spread factors to be used during the transmission in accordance with a predetermined coding rule;
        according to said determining, re-determining the dynamic connection-oriented rate matching factor as a quotient of a maximum volume of data for the connection and a sum of the total volume of data of the two or more services of the connection, taking into consideration respective service-specific steady-state rate matching factors.

3. A method according to claim 1, further comprising, if the dynamic connection-oriented rate matching factor is greater than a maximum value related to a most expanded service to be expanded most severely, accepting additional data into the frame and re-determining the dynamic connection-oriented rate matching factor.

4. A method according to claim 1, further comprising inserting the data of the services in a frame in accordance with a predetermined coding rule which is oriented toward a minimum of transmission channels for the connection.

5. A method according to claim 1, further comprising, before the dynamic connection-oriented rate matching factor is determined, relating the steady-state rate matching factors to corresponding geometric means so that a product of two or more steady-state rate matching factors of a connection is equal to one.

6. A method according to claim 1, further comprising signaling a volume of data per service for each transmitted frame.

7. A device for data rate matching for simultaneous radio transmission of data of a plurality of services of a connection between a base station and a subscriber station, comprising: processing hardware, including memory, to implement a compander compressing or expanding the data of a service of the plurality of services of the connection to be transmitted in a frame using a service-specific overall rate matching factor which matches a total volume of data to be transmitted of two or more services of the connection to a transmission capacity in the frame, the total volume determined by a combination of a service-specific steady-state rate matching factor and a connection-oriented dynamic rate matching factor, the dynamic connection-oriented rate matching factor being a service-dependent total rate matching factor that matches a total volume of data of two or more services of the connection taking into consideration the service-specific steady-state rate matching factors of the services.

8. A device according to claim 7, wherein the device is the base station.

9. A device according to claim 7, wherein the device is the subscriber station.

* * * * *

UNITED STATES PATENT AND TRADEMARK OFFICE
CERTIFICATE OF CORRECTION

| | | |
|---|---|---|
| PATENT NO. | : 8,989,168 B2 | Page 1 of 1 |
| APPLICATION NO. | : 12/140158 | |
| DATED | : March 24, 2015 | |
| INVENTOR(S) | : Anja Klein et al. | |

It is certified that error appears in the above-identified patent and that said Letters Patent is hereby corrected as shown below:

In the Claims

Column 8, line 13, In Claim 7, after "of" insert -- the --.

Signed and Sealed this
Twenty-first Day of July, 2015

Michelle K. Lee
*Director of the United States Patent and Trademark Office*